June 23, 1953 — E. J. LIME ET AL — 2,643,322
LIQUID HEATER FOR HOT BEVERAGE VENDING MACHINES
Filed Feb. 23, 1951 — 2 Sheets-Sheet 1
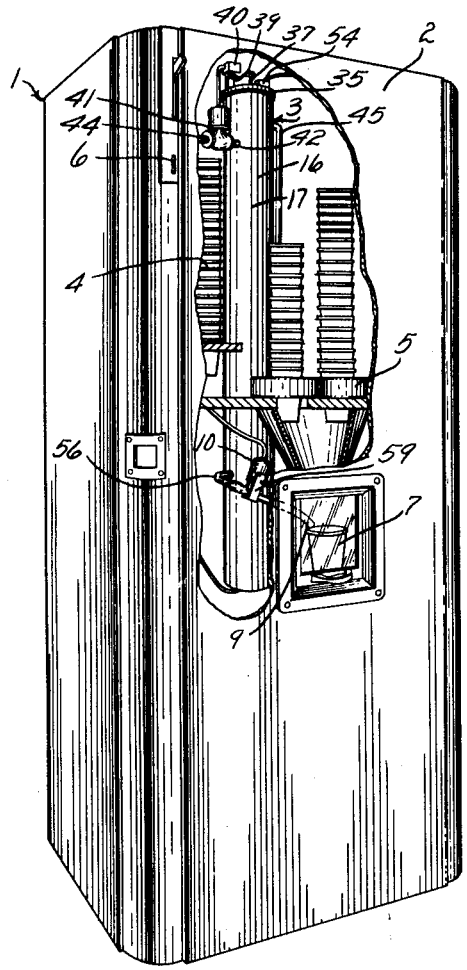
Fig.1.
Fig.3.
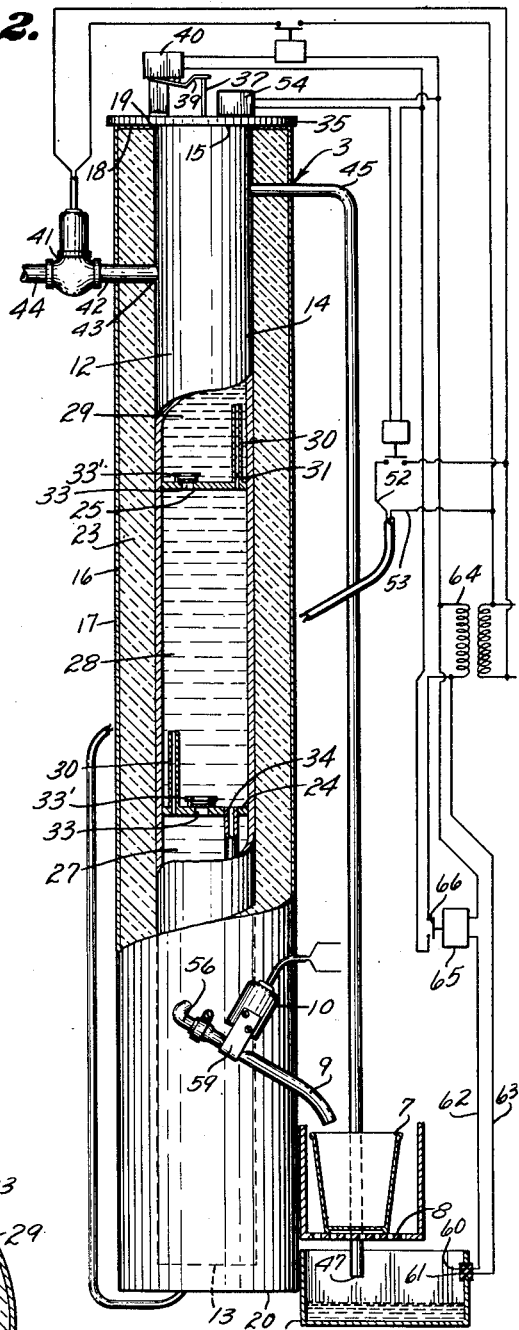
Fig.2.
INVENTORS.
Ermal J. Lime and
Charles S. Hedges
BY Fishburn & Mullendore
ATTORNEYS.

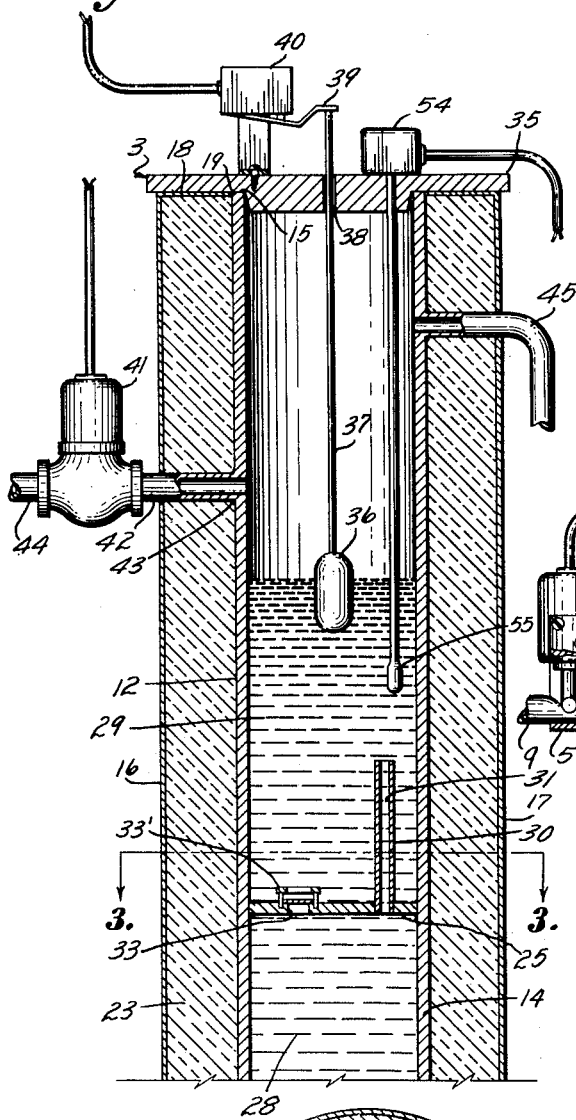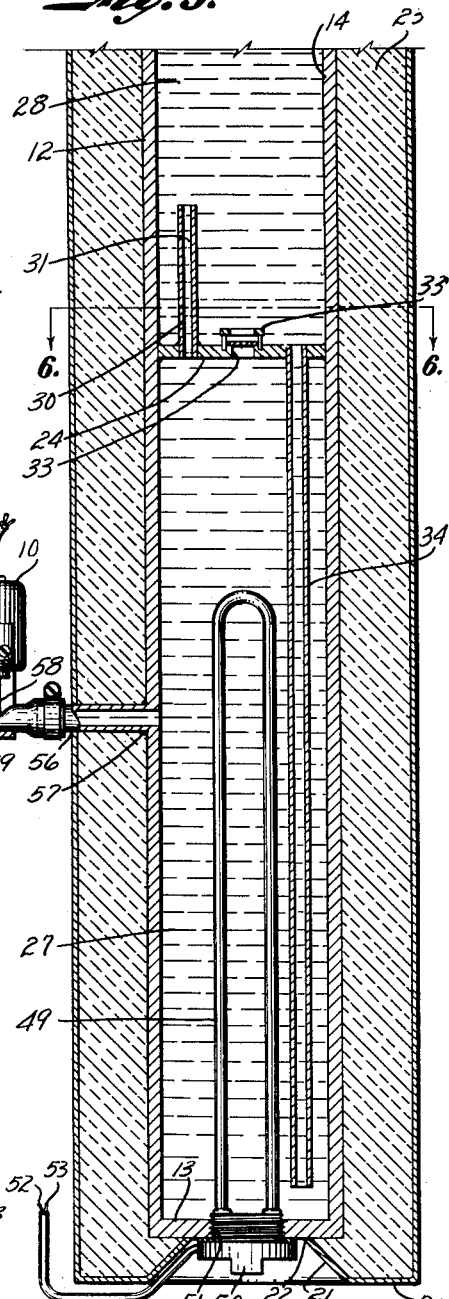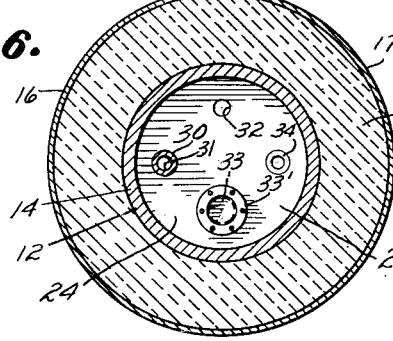

Patented June 23, 1953

2,643,322

UNITED STATES PATENT OFFICE 2,643,322

LIQUID HEATER FOR HOT BEVERAGE VENDING MACHINES

Ermal J. Lime and Charles S. Hedges, Kansas City, Mo., assignors to Crelo Manufacturing Company, Inc., Kansas City, Mo., a corporation of Missouri Application February 23, 1951, Serial No. 212,444

6 Claims. (Cl. 219—38)

This invention relates to hot beverage vending machines and more particularly to apparatus for heating and dispensing hot water for brewing hot beverage such as coffee and tea.

The steeping method of making coffee consists in placing a measured quantity of freshly roasted and ground coffee beans in a receptacle, then adding a measured quantity of hot water and allowing the mixture to "steep" for several minutes. The success of this method depends entirely upon having brewing water at or very near the boiling temperature, the most complete success being attained if water is dispensed from the heating tank at the boiling temperature. With an ordinary heating tank it is impractical to heat the water to the boiling temperature if the tank is incorporated in, say, a vending machine where a supply of boiling water must be kept instantly available for intermittent customer use. In the first place, excessive vaporization from the upper surface of the water would cause destructively high humidity within the vending machine, and in some cases annoyingly high humidity within the room in which the vending machine is installed. In the second place, thermostatic control of the heating element could not be used since water temperature cannot exceed the boiling point and could, therefore, not rise high enough to cut off the thermostat. It is necessary then, in an ordinary heating tank, to set the thermostat at about 20 degrees below the boiling temperature to overcome the above objections. Also, the thermostat setting might need to be varied if the vending machine is moved to a different altitude, or sometimes would need to be varied from day to day as the barometric pressure varied. The present invention overcomes these objectionable effects and has other novel features to be described.

The objects of the present invention are to provide a liquid heating apparatus from which liquid, such as water substantially at the boiling point, is dispensed from near the bottom thereof; to provide a liquid heating apparatus having controlled heated zones, the hottest of which is at the bottom of the apparatus and hot liquids dispensed therefrom and a float controlled cold liquid supply at the top of the apparatus whereby the cold liquid supply does not immediately enter and appreciably cool the hottest zone or dispensing of said liquid; to provide a liquid heating apparatus which will dispense water substantially at the boiling point without resetting the thermostat for different altitudes at which the boiling point will be different; to provide such apparatus which maintains the hottest liquid in the lower portion thereof and has the same head of liquid whereby the same predetermined quantity of liquid is dispensed from the lower hottest portion on each opening of a dispensing device for a fixed time interval; to provide a liquid heating apparatus with a compartmental or sectionalized tank having restricted movement of liquids from one compartment to another; to provide such a compartmental tank with a liquid heating device in the lowermost compartment; to provide compartmental liquid heating apparatus in which liquid such as water is maintained substantially at the boiling point in the lower compartment and cooler liquid in the uppermost compartment exposed to atmosphere to minimize vaporization from the surface; to provide controls in a liquid heating apparatus for assuring safe, positive operation thereof; and to provide a liquid heating apparatus which is economical to manufacture and operate for dispensing hot liquids in hot beverage vending machines.

In accomplishing these and other objects of the present invention we have provided improved details of structure, the preferred forms of which are illustrated in the accompanying drawings, wherein:

Fig. 1 is a perspective view of a hot beverage vending machine with portions of the case broken away to illustrate the arrangements of parts therein.

Fig. 2 is an elevational view of the liquid heating apparatus with portions broken away to illustrate the internal structure thereof.

Fig. 3 is a transverse sectional view through the heating apparatus on the line 3—3, Fig. 4.

Fig. 4 is a vertical sectional view through the upper portion of the heating apparatus.

Fig. 5 is a vertical sectional view through the lower portion of the liquid heating apparatus.

Fig. 6 is a transverse sectional view through the heating apparatus on the line 6—6, Fig. 5.

Referring more in detail to the drawings:

1 designates a hot beverage vending machine having a casing 2 enclosing a liquid heating apparatus 3, a cup storage 4, and a cup dispenser 5, operated to dispense hot beverage in response to insertion of a coin into a coin slot 6 for actuating a suitable coin mechanism (not shown). The cup dispenser 5 drops a single cup 7 onto a platform 8 in position to receive hot liquid from a tube or spout 9, the delivery of said liquid being controlled by a solenoid actuated valve 10 which is energized responsive to actuation of the coin mechanism, the hot liquid discharged from the spout 9 being drawn from the liquid heating apparatus 3. After the water is discharged into the cup, a transparent door is raised providing access to the filled cup.

The heating apparatus 3 consists of a vertically arranged elongated tank 12 having a bottom wall 13 and upwardly extending side wall 14. The tank is illustrated as being circular but may be of any other desired cross-sectional shape. The upper end of the wall 14 terminates as at 15 to provide an open top to the tank. A shell 16 surrounds the tank and preferably consists of a vertical wall 17 spaced from the wall 14, the upper end of the wall 17 being turned inwardly to form a top wall 18, the inner edge of which is suitably secured as at 19 to the upper end of the tank wall 14. The lower end of the wall 17 extends below the bottom wall 13 of the tank and has an inwardly turned portion 20 forming a bottom wall of the shell, said bottom wall terminating in an upwardly and inwardly sloping portion 21, the inner edge of which is suitably secured as at 22 to the bottom wall 13 of the tank. Suitable insulation 23 fills the space between the walls of the shell and tank.

A plurality of vertically spaced partitions 24 and 25 are arranged in the tank intermediate the top and bottom thereof, said partitions having peripheral edges engaging and suitably secured to the interior of the wall 14 to form a compartmental or sectionalized structure having bottom, intermediate, and top compartments 27, 28 and 29, respectively. Each partition is provided with an upwardly extending vent tube 30 having a passage 31 extending vertically through the tube and partition to provide communication for the compartments above and below the partition. The tube on the partition 25 is preferably on the opposite side of the tank relative to the tube on the partition 24. The partitions are also each provided with a small aperture 32 for flow of liquid from the upper compartment 29 to the intermediate compartment 28. An aperture 33 is provided in each partition and valves 33' are arranged to seat on the upper surface of each partition to close said aperture, said valves being movable upwardly to open the apertures for restricted movement of water and water vapor from the next lower compartment. The partition 24 has a tube 34 extending downwardly therefrom to adjacent the bottom of the lower compartment 27, said tube having a passage extending therethrough and through the partition 24 for flow of water from the intermediate compartment to the lower compartment 27. The apertures and passages are small relative to the diameter of the tank whereby there is communication between the compartments but only a slow or restricted flow of liquid therebetween.

A cover 35 is removably mounted on the top wall 18 and upper end of the tank wall. A float 36 is arranged in the upper compartment 29 on the lower end of a rod 37 which loosely extends through an aperture 38 in the cover 35. The upper end of the rod 37 is suitably secured to a switch arm 39 of an electric switch structure 40 suitably mounted on the cover 35, in a position that elevation of the float 36 in response to raising of the liquid level in the tank will open the switch and lowering the liquid level below a predetermined point will cause lowering of the float 36 and movement of the switch arm 39 in response thereto to complete an electric circuit to the solenoid valve 41 which controls the liquid supply to the tank.

The valve 41 is normally in closed position and opens in response to energization of the solenoid, said valve being arranged in an inlet pipe 42 which is suitably secured to the tank wall 14 as at 43 and extends through the insulation 23 and shell wall 17. The inlet of the valve 41 is connected by a pipe 44 with a suitable source of water supply. The pipe 42 has communication with the upper compartment 29 intermediate the cover and desired level of water in said upper compartment whereby the delivery of inlet water is above the liquid level.

An overflow and vent tube 45 extends through the shell wall 17 and insulation and is suitably secured to the tank wall 14 intermediate the water inlet and the cover 35 as illustrated in Fig. 4. The tube 45 extends downwardly and terminates in an open end 47 located in a safety overflow basin 48 located at the lower end of the heating apparatus as later described. The location of the point of communication of the bore of the tube 45 with the upper compartment is such that it provides an overflow and maximum level of the water in the tank. However, the tube also provides a vent at the upper end of the tank whereby the upper compartment is maintained substantially at atmospheric pressure.

Water delivered to the tank through the inlet pipe 42 flows downwardly therein through the aperture 32 in the partition 25 and passage in the tube 34 completely filling the lower and intermediate compartments, the upper compartment being filled to a level determined by the float 36 as illustrated in Fig. 4. Heat is applied to the water in the lower compartment to raise the temperature of the water therein to approximately the boiling point. The heat is preferably applied by an electric immersion type heater 49 carried by a plug 50 which is screwed into a central threaded bore 51 in the bottom wall 13, the immersion heater extending vertically from the plug for a substantial portion of the bottom compartment 27. Electric energy is supplied to the electric heater through conductors 52 and 53 which extend into the plug 50 and are connected to the terminals of the heating element, the heating element and conductors being insulated from the plug. The electric circuit supplying current to the heater is controlled by a thermostat 54 mounted on the upper portion of the apparatus, for example, on the cover 35 and having a heat responsive element 55 extending into the water in the upper compartment 29.

A hot water outlet pipe 56 extends through the shell and insulation and suitably secured as at 57 to the wall 14 of the tank, said pipe having communication with the lower compartment substantially midway the height thereof and below the upper end of the heating element 49. The discharge of hot liquid from the lower compartment 27 through the pipe 56 may be controlled through any suitable valve. For convenience and simplicity the discharge tube or spout 9 is suitably connected to the end of the pipe 56 and extends downwardly therefrom to position the end of said tube over the cup 7 and the flow of water through the tube is controlled by a solenoid arrangement having a spring pressed plunger 58 which is normally forced into engagement with the tube to compress same between the end of the plunger and a bracket 59 to close off flow of liquid through the tube. Energization of the solenoid through actuation of the coin mechanism retracts the plunger 58 from the tube and permits flow of the hot liquid therethrough, the discharge pipe and/or the tube having a predetermined flow capacity and the head of liquid in the tank remaining substantially the same permits the amount of liquid dispensed into the cup 7 to be controlled by a suitable timer in the coin mechanism (not shown) whereby after the elapse of a predetermined time the solenoid is deenergized and the plunger moved against the tube to compress same and stop flow of liquid therethrough.

In the event of overflow, the water will flow through the tube 45 into the basin 48. This basin is also arranged under the platform 8 to catch any water that might be spilled or overflow the cup 7. Extending through the side wall of the basin 48 and below the top edge thereof are terminals 60 and 61 insulated from the basin and exposed to the liquid therein. When the liquid raises in the basin to the height of the contacts 60 and 61, said liquid will form a conductor to complete the circuit between the conductors 62 and 63 whereby current flows through the transformer secondary 64, conductors 63, terminals 61, the liquid and terminal 60 and conductor 62 to energize the relay 65 and effect opening of the switch 66 and disconnect all electrical energy from the heating apparatus and associated controls. The relay 65 has a spring arrangement thereon which returns the switch 66 to closed position when the relay is deenergized by the liquid level being lowered in the basin 48 to break the circuit across the contacts 60 and 61.

In operating a heating apparatus constructed and connected as described, the electric circuit is closed to energize same. In initially starting the tank empty, the float 36 will be in position to close the switch 40 and complete the circuit to the solenoid valve 41 to open the valve for flow of water into the upper compartment of the tank. The water will then flow through the aperture 32 in the partition 25 into the intermediate compartment and through the passage in the tube 34 to the lower compartment 27. When the lower compartment is filled, any air that might tend to be trapped below the partition will pass upwardly through the passage 31 in the tube 30. When the tank is filled to the desired level the float 36 will raise actuating the switch 40 to break the circuit to the solenoid 41 which then closes to shut off flow of water to the tank. The thermostat 54 is preferably set to complete the circuit to the heating element 49 when the temperature of the water in the upper compartment drops below a predetermined temperature, for example 180° F. and break the circuit to the heating element when the temperature of the water in the upper compartment reaches a predetermined temperature, for example 185° F. The heating element while energized will heat the water in the lower compartment which is under a pressure of the head of water in the intermediate and upper compartments. There is a natural tendency for heated water in a tank to rise to the top of the liquid. However, the partitions retard this normal action, because the apertures in said partitions are small. However, as the water in the lower compartment 27 approaches the boiling point, vapors tend to form bubbles which rise to the upper end of the lower compartment and lift the valve 33' for escape through the aperture 33 into the intermediate compartment. Some vapors may also pass through the passage 31. These hot vapors tend to heat the water in the intermediate compartment, but the cooler water therein condenses the vapors. Some of the bubbles of vapor will rise to the upper end of the intermediate chamber and lift the valve 33' and pass through the aperture 33, some vapors also passing through the aperture 32 and passage 31 in the partition 25 into the upper compartment to heat the water therein where again the cool water tends to condense the vapors and thereby reduce loss of water by vaporization.

It has been found that with this arrangement of a compartmental tank, the water in the lower compartment can be maintained within a few degrees of boiling temperature with the water in the intermediate compartment at approximately 5 to 10° lower and the water in the upper compartment approximately 20° lower. When water is discharged from the lower compartment through the outlet 56, the level in the upper compartment is lowered and the float will actuate the switch which in turn will complete the circuit to energize the solenoid valve 41 to effect delivery of more cool water to the upper compartment to replace the water drawn from the tank. The cool inlet water of course will cause the temperature in the upper compartment to lower and when it drops below the predetermined temperature, for example 180°, the thermostat will effect a circuit to the heating elements to again apply heat to the lower compartment to raise the temperature of the water therein to approximately the boiling point.

However, the maintenance of a temperature substantially at the boiling point of the water in the lower compartment does not effect any appreciable loss of water due to the condensing of the vapors before they pass from the body of water in the tank. Since the upper compartment is vented to the atmosphere, there is no danger of creating high pressures due to vapors in the tank and the pressure at the discharge outlet pipe 56 remains substantially the same whereby timed opening of the discharge tube provides a predetermined quantity of water in the cup 7. Said water being substantially at the boiling point will form coffee by the steep method which is well recognized as being a desirable manner of coffee making.

If the float should stick and the level of water in the tank raise to the overflow tube or if the tube 9 should leak, the water will flow into the basin 48 and when the level of the water in said basin makes the circuit across the contacts 60 and 61, the circuit to the heating apparatus and controls will be interrupted by the opening of the switch 66.

It is believed obvious that I have provided an improved liquid heating apparatus for hot beverage vending machines wherein the liquid may be maintained substantially at the boiling point with a minimum of energy and loss of water through vaporization, the apparatus operating at atmospheric pressure thereby eliminating danger of ruptured tanks due to creation of steam pressure therein.

What we claim and desire to secure by Letters Patent is:

1. A liquid heating apparatus comprising, an elongated vertical tank, a plurality of vertically spaced partitions in said tank intermediate the top and bottom thereof and forming upper, intermediate, and lower compartments, said partitions having apertures therein for restricted movement of liquid from one compartment to another, the uppermost compartment being vented to atmosphere, means for applying heat to the lower compartment for heating the liquid therein whereby any liquid vapors from the hot liquid pass through the apertures in the partitions to the upper compartments and are condensed partially heating the liquid in the upper compartment, a valved liquid inlet connected to a source of cold liquid supply and having communication with the upper compartment for delivery of cold liquid thereto, remote from the hot liquid in the lower compartment, means responsive to liquid level in the uppermost compartment for controlling operation of the valved means to substantially maintain a predetermined level of liquid in the uppermost compartment and substantially full intermediate and lower compartments, and a valved outlet communicating with the lower compartment for selective discharge of hot liquid therefrom.

2. A liquid heating apparatus comprising, an elongated vertical compartmental tank for containing liquid to be heated, one compartment being above another and having communicating apertures for restricted movement of liquid from one compartment to another, a valved liquid inlet connected to a source of cold liquid supply and communicating with the uppermost compartment for delivery of cold liquid thereto, a float actuated means responsive to liquid level in the uppermost compartment for controlling operation of the valved liquid inlet to substantially maintain a predetermined liquid level in the uppermost compartment and substantially full lower compartments, means for applying heat to the lowermost compartment for heating the liquid therein whereby any vapors from the hot liquid pass through the communicating apertures to upper compartments and are condensed partially heating the liquid in the upper compartments, temperature responsive means in the uppermost compartment controlling energization of the heating means, and a valved outlet communicating with the lowermost compartment for selective discharge of hot liquid therefrom.

3. A liquid heating apparatus comprising, an elongated vertical tank, a plurality of vertically spaced partitions in said tank intermediate the top and bottom thereof and forming upper, intermediate, and lower compartments, said partitions having apertures therein for restricted movement of liquid from one compartment to another, a valved liquid inlet connected to a source of cold liquid supply and communicating with the upper compartment for delivery of cold liquid thereto, a float actuated means responsive to liquid level in the upper compartment for controlling operation of the valved liquid inlet to substantially maintain a predetermined liquid level in the uppermost compartment and substantially full intermediate and lower compartments, means for applying heat to the lower compartment for heating liquid therein whereby any vapors from the hot liquid pass through the apertures in the partitions to upper compartments and are condensed partially heating the liquid in said upper compartments, temperature responsive means in one of the upper compartments controlling energization of the heating means, and a valved outlet communicating with the lower compartment for selective discharge of hot liquid therefrom.

4. A liquid heating apparatus comprising, an elongated vertical tank, a plurality of vertically spaced partitions in said tank intermediate the top and bottom thereof and forming upper, intermediate, and lower compartments, means venting the upper compartment to the atmosphere, said partitions having apertures therein for restricted movement of liquid from one compartment to another, means having passages therein extending upwardly from each partition providing communication between said compartments, a liquid inlet connected with a source of cold liquid supply and communicating with the upper compartment for delivery of cold liquid thereto, valve means in said liquid inlet for controlling flow of liquid therethrough, a float actuated means responsive to liquid level in the upper compartment for controlling the operation of the liquid inlet valve to substantially maintain a predetermined liquid level in the uppermost compartment and substantially full intermediate and lower compartments, a heater supported at the lower end of the lower compartment for heating the liquid therein whereby any vapors from the hot liquid pass through the apertures in the partitions to upper compartments and are condensed partially heating the liquid in said upper compartments, temperature responsive means in the upper compartment controlling energization of the heating means, and a valved outlet communicating with the lower compartment for selective discharge of hot liquid from said lower compartment.

5. A liquid heating apparatus comprising, an elongated vertical tank, a plurality of vertically spaced partitions in said tank intermediate the top and bottom thereof and forming upper, intermediate, and lower compartments, said partitions having apertures therein for restricted movement of liquid from one compartment to another, a liquid inlet connected with a source of cold liquid supply and communicating with the upper compartment for delivery of cold liquid thereto, valve means in said liquid inlet for controlling flow of liquid therethrough, a float actuated means responsive to liquid level in the upper compartment for controlling the operation of the liquid inlet valve to substantially maintain a predetermined liquid level in the uppermost compartment and substantially full intermediate and lower compartments, an electric immersion heater supported at the lower end of the lower compartment and extending upwardly therein for a substantial portion of the height of said lower compartment whereby any vapors from the hot liquid pass through the apertures in the partitions to upper compartments and are condensed partially heating the liquid in said upper compartments, temperature responsive means in the upper compartment controlling energization of the heating means, and a valved outlet communicating with the lower compartment below the upper end of the heating element for selective discharge of hot liquid from said lower compartment.

6. A liquid heating apparatus comprising, an elongated vertical tank, a shell surrounding said tank and spaced therefrom, heat insulation material between the tank and shell, a plurality of vertically spaced partitions in said tank intermediate the top and bottom thereof and forming upper, intermediate, and lower compartments, means venting the upper compartment to the atmosphere, said partitions having apertures therein for restricted movement of liquid from one compartment to another, means having passages therein extending upwardly from each partition providing communication between said compartments, a liquid inlet connected with a source of cold liquid supply and communicating with the upper compartment for delivery of cold liquid thereto, valve means in said liquid inlet for controlling flow of liquid therethrough, a float actuated means responsive to liquid level in the upper compartment for controlling the operation of the liquid inlet valve to substantially maintain a predetermined liquid level in the uppermost compartment and substantially full intermediate and lower compartments, an electric immersion heater supported at the lower end of the lower compartment and extending upwardly therein for a substantial portion of the height of said lower compartment whereby any vapors from the hot liquid pass through the apertures in the partitions to upper compartments and are condensed partially heating the liquid in said upper compartments, temperature responsive means in the upper compartment controlling energization of the heating means, and a valved outlet communicating with the lower compartment below the upper end of the heating element for selective discharge of hot liquid from said lower compartment.

ERMAL J. LIME.
CHARLES S. HEDGES.

References Cited in the file of this patent

UNITED STATES PATENTS

| Number    | Name  | Date          |
|-----------|-------|---------------|
| 1,920,013 | Green | July 25, 1933 |
| 1,952,856 | Green | Mar. 27, 1934 |
| 1,971,154 | Green | Aug. 21, 1934 |